(12) United States Patent
Spokoyny

(10) Patent No.: US 7,273,595 B2
(45) Date of Patent: Sep. 25, 2007

(54) METHOD AND APPARATUS FOR THE PRODUCTION OF GASEOUS AMMONIA FROM A UREA SOLUTION

(76) Inventor: Felix E. Spokoyny, 37 Avignon, Newport Coast, CA (US) 92657

( * ) Notice: Subject to any disclaimer, the term of this patent is extended or adjusted under 35 U.S.C. 154(b) by 448 days.

(21) Appl. No.: 11/027,972

(22) Filed: Dec. 30, 2004

(65) Prior Publication Data

US 2006/0147361 A1    Jul. 6, 2006

(51) Int. Cl.
- *B01D 53/34* (2006.01)
- *B01D 53/50* (2006.01)
- *B01D 53/56* (2006.01)

(52) U.S. Cl. .................. 423/210; 423/235; 423/239.1; 423/243.06; 423/215.5; 423/355; 423/DIG. 5; 422/105; 422/110; 422/111; 204/157.42; 204/157.46

(58) Field of Classification Search ............... 423/210, 423/235, 239.1, 243.06, 215.5, 355, DIG. 5; 422/105, 110, 111; 204/157.42, 157.46
See application file for complete search history.

(56) References Cited

U.S. PATENT DOCUMENTS

| | | | |
|---|---|---|---|
| 2,356,717 A | | 8/1944 | Williams |
| 2,500,008 A | * | 3/1950 | Richardson ............ 204/157.42 |
| 3,900,554 A | | 8/1975 | Lyon |
| 4,124,536 A | | 11/1978 | Itoh |
| 5,024,171 A | | 6/1991 | Krigmont |
| 5,372,634 A | | 12/1994 | Monahan |
| 5,538,628 A | | 7/1996 | Logan |
| 6,077,491 A | | 6/2000 | Cooper |
| 6,093,380 A | | 7/2000 | Lagana |
| 6,500,219 B1 | | 12/2002 | Gunnerman |
| 2004/0057887 A1 | * | 3/2004 | Sun et al. .................. 423/235 |

OTHER PUBLICATIONS

D. Hairston "Ultrasound makes waves in the CPI" Chemical Engineering, Aug. 1999, p. 26-27.
A. Fisher "Star in a jar" Popular Science, Dec. 1998, p. 88-91.

* cited by examiner

*Primary Examiner*—Timothy C. Vanoy
(74) *Attorney, Agent, or Firm*—Howard E. Sandler

(57) ABSTRACT

A safe, economical and predictable process for producing ammonia from a urea solution, preferably where only a small amount of ammonia is required, (i.e. for SCR denitrification for small boilers, flue gas conditioning to enhance precipitator efficiency and/or alleviate plume problems, SNCR and the like), using an ultrasonic processor to cause "cold boiling" of portions of such solution and produce gaseous ammonia.

7 Claims, 5 Drawing Sheets

METHOD AND APPARATUS FOR THE PRODUCTION OF GASEOUS AMMONIA FROM A UREA SOLUTION

BACKGROUND OF THE INVENTION

Ammonia is an extremely important chemical which has innumerable uses in a wide range of areas, for example: process, industry and utility uses. The instant invention is concerned with a method and means to safely produce relatively small amounts (i.e. up to 150 pounds per hour, and perhaps up to 300 pounds per hour) of ammonia from urea, for such uses.

Areas of use for such relatively small quantities of ammonia are quite varied and, for purposes of this discussion, such areas include, but are not limited to: providing ammonia equipment and processes, of the type illustrated in U.S. Pat. No. 2,356,717, to help increase the efficiency of an electrostatic precipitator to remove flyash from the flue gas stream of a fossil fuel burning boiler; to alleviate "blue plume" problems when burning a high sulfur content oil in a boiler such as illustrated in U.S. Pat. No. 5,024,171; and to remove the NOx contaminants contained in a flue gas stream of energy producing boilers or combined cycle systems, in conjunction with selective catalytic reduction (SCR), and/or selective non-catalytic reduction (SNCR), systems (see U.S. Pat. Nos. 4,124,536 and 3,900,554, respectively).

Ammonia for uses such as described above, is often delivered in the form of anhydrous ammonia, or aqueous ammonia. Anhydrous ammonia is used in massive quantities world-wide for many industrial and agricultural purposes. Anhydrous ammonia is gas at ambient temperatures and pressures, and is normally shipped and stored as a liquid, either in pressure vessels at ambient temperature, and high pressure (i.e. over 16 bars), or in refrigerated vessels at ambient or nearly ambient pressure, and at about −33° C. It is transported in bulk in ships, barges, and railroad tank cars, and in tank trucks on public roads and highways and, in instances of relatively small usage per hour, such as envisioned with the present invention, perhaps in high pressure cylinders. It is frequently used and stored at industrial sites in populated areas. It is now coming into wider use for the removal of NOx from flue gas at power generating stations, industrial heaters, or in combined cycle systems, in urban areas.

Anhydrous ammonia is an extremely hazardous, toxic, and volatile material. In the event of an accidental discharge, it can cause immediate death or injury to humans and animals and rapid death to trees and plants. Both anhydrous liquid ammonia, and concentrated aqueous liquid ammonia, display a deadly characteristic which substantially increases the risk of widespread injury and death in case of a spill. Specifically, upon sudden release to the atmosphere, as might occur in a sudden and accidental discharge, the ammonia can form a cloud produced of an aerosol fog of liquid ammonia droplets. Unlike gaseous ammonia, which, though toxic, is lighter than air and quickly dissipates to harmless concentrations, the cloud can persist for a surprisingly long time, as long as several hours, before it finally disappears. The cloud is typically heavier than air and tends to drift along the surface of the earth, i.e., the ground or the surface of a body of water. The cloud moves with the wind and can sweep over a total area, i.e., a "footprint," much larger than the area covered by the cloud at any one moment. Contact with the cloud may be instantly incapacitating, and a single breath can be fatal.

In addition to the inherent danger of storing, transporting and handling large quantities of ammonia, the expense insofar as safety aspects, insurance costs, specialized training, and the difficult to quantify emotional exposure of living and/or working next to a such potential catastrophe, it is apparent that if another, less hazardous commodity could be transported or stored instead of ammonia, and then be readily converted to ammonia, the hazards associated with ammonia shipment and handling would be considerably reduced. To some extent, attempts have been made in the supply of ammonia for NOx control in power plant and industrial environments by substituting concentrated aqueous liquid ammonia for anhydrous ammonia. Such a solution has achieved only limited success, due to any number of factors, for example: the high energy cost of transporting and vaporizing the water carrier, relatively costly storage facilities; and, even though aqueous ammonia is safer to handle than anhydrous ammonia, it is still difficult and costly to handle in a safe manner.

Urea is an ideal candidate as an ammonia substitute. Urea is a non-toxic chemical compound and, for purposes of this discussion, presents essentially no danger to the environment, animals, plant life and human beings. It is solid under ambient temperatures and pressures. Consequently, urea can be safely and inexpensively shipped in bulk and stored for long periods of time until it is converted into ammonia It will not leak, explode, be a source of toxic fumes, require pressurization, increase insurance premiums, require extensive safety programs, or be a concern to the plant, community and individuals who may be aware of the transportation and/or storage dangers of ammonia Further, urea can be used to produce gaseous ammonia:

on-site
on-demand
with rapid response time
with maximum turn down availability
with utmost safety
with significant economies
with automatic operation
with low maintenance The use of urea with the advantages discussed hereinabove were recognized by Applicant heretofore, as illustrated, described and claimed in his U.S. Pat. No. 6,093,380. In addition to the system described in the '380 Patent, another commercially available system which also produces ammonia form a urea feed stock is shown in U.S. Pat. No. 6,077,491 The prior art systems mentioned in this paragraph have been used primarily for fulfilling relatively larger ammonia requirements and, as such, are not necessarily the most appropriate design for small ammonia production requirements. For example—cost, unnecessarily high pressure and temperature requirements, speciality metals, physical and chemical scale down problems, load following requirements, expensive or ineffective controls for such small ammonia production requirements, and the like.

SUMMARY OF THE INVENTION

By means of the present invention which starts with a solutionized urea feed stock, and uses an ultrasonic generator in accordance with the applied principles of sonochemistry to produce $NH_3$ and $CO_2$ (i.e. $(NH_2)_2CO + H_2O \rightarrow 2NH_3 + CO_2$) on site and on demand, the hereinabove mentioned deficiencies of prior art systems are overcome or, in the least, greatly alleviated, for the production of small quantities of ammonia for use in downstream processes. In particular, the ammonia production systems of the present invention operates as follows:

1. Solutionized urea is obtained from a suitable source;
2. The solutionized urea is passed through, or in the vicinity of, ultrasonic waves produced by an ultrasonic transducer or the like, to produce a powerful sonic field in the solutionized urea The frequency of the ultrasonic field is in the range of 15 to 100 kHz, preferably in the range of 20 to 40 kHz.
3. Applying the ultrasonic field to the solutionized urea results in ultrasonic processing, which is the blasting of liquids with the very intense sound of high frequency producing very good mixing and powerful chemical and physical reactions. More specifically, sonochemistry is the result of acoustic cavitation, the formation, growth and implosive collapse of bubbles in a liquid. The collapse of such bubbles creates hot spots with temperatures as high as 5000° C., pressures up to 800 bar. These conditions are responsible for a variety of chemical and physical effects. For example, volatile precursors have been sonochemically decomposed into nanostructured materials with unique morphology and catalytic activity. In the instant situation of applying ultrasonic waves to the solutionized urea, ammonia and carbon dioxide are generated by the transitory high temperature and pressure hydrolysis process, and released from the solution. Some of this ammonia and carbon dioxide is in the form of free gas and other of such is locked in solution. It is to be noted that these high pressures and temperatures only occur for milliseconds and do not effect the temperature and pressure of the working fluid, which is generally maintained in the range of 80 to 150° C. and 1-5 bar (preferably 1.2-3 bar).
4. To free the gas locked in solution, the flow is then sparged (i.e. by steam or other physical agitation). In all instances heat is applied to the solution to maintain it at or near its boiling point.

As can be readily appreciated, a system, such as described above, for the conversion of urea to ammonia on site and on demand: will obviate the need for high pressure and/or high temperature; only a relatively small chamber for process requirements is necessary; is highly controllable (i.e. both the intensity of the ultrasonics and the sparging fluid); is relatively inexpensive; only requires moderate controls; there is no need for specialized materials; and the like.

DETAILED DESCRIPTION OF THE PREFERRED EMBODIMENT

Figure 1:
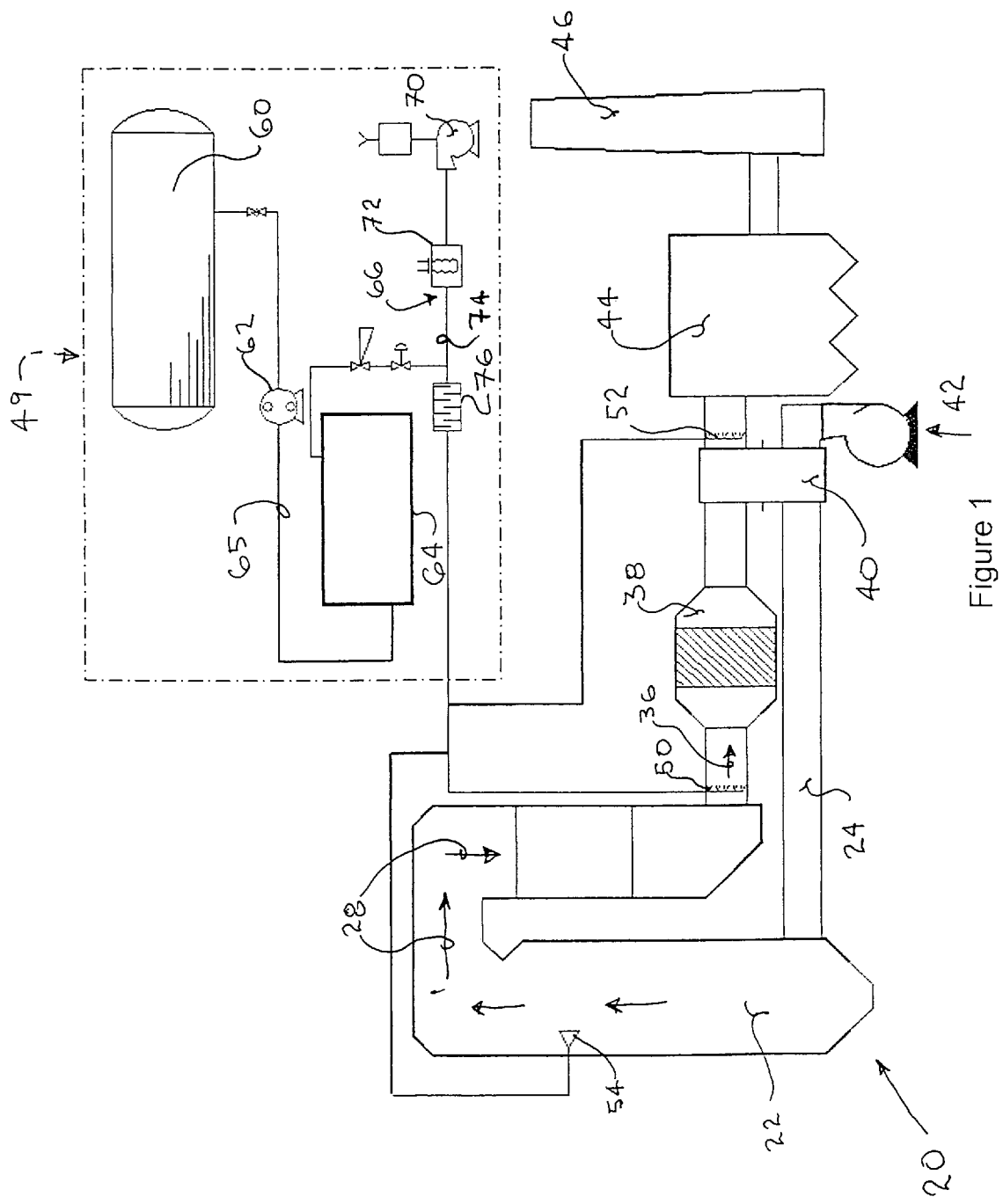
FIG. 1 is a schematic representation of a fossil fuel burning power plant which incorporates the principles of the present invention.
Figure 2:
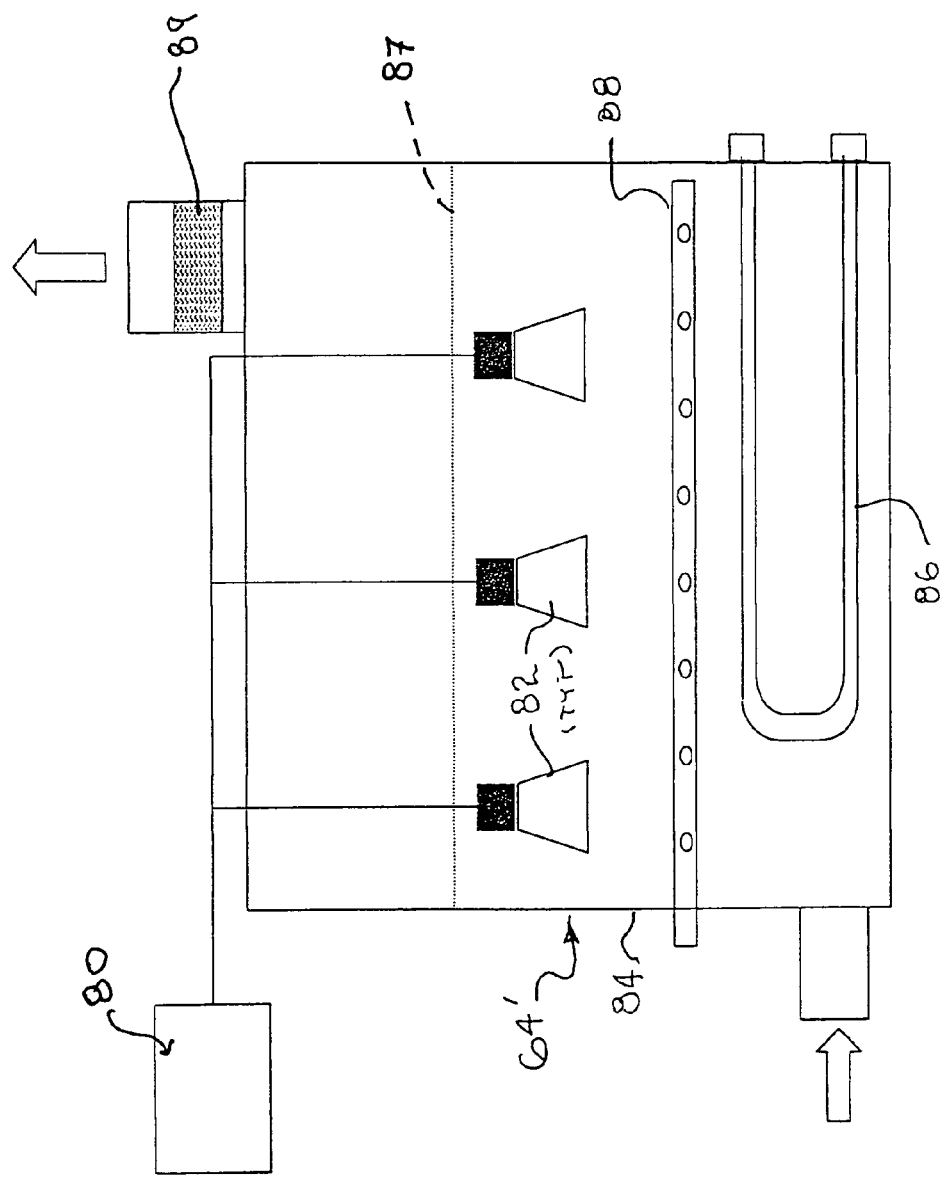
FIG. 2 is a schematic representation of an on-site, on-demand urea to ammonia system constructed in accordance with the principles of the present invention, and which is of the type incorporating immersible transducers.
Figure 3:
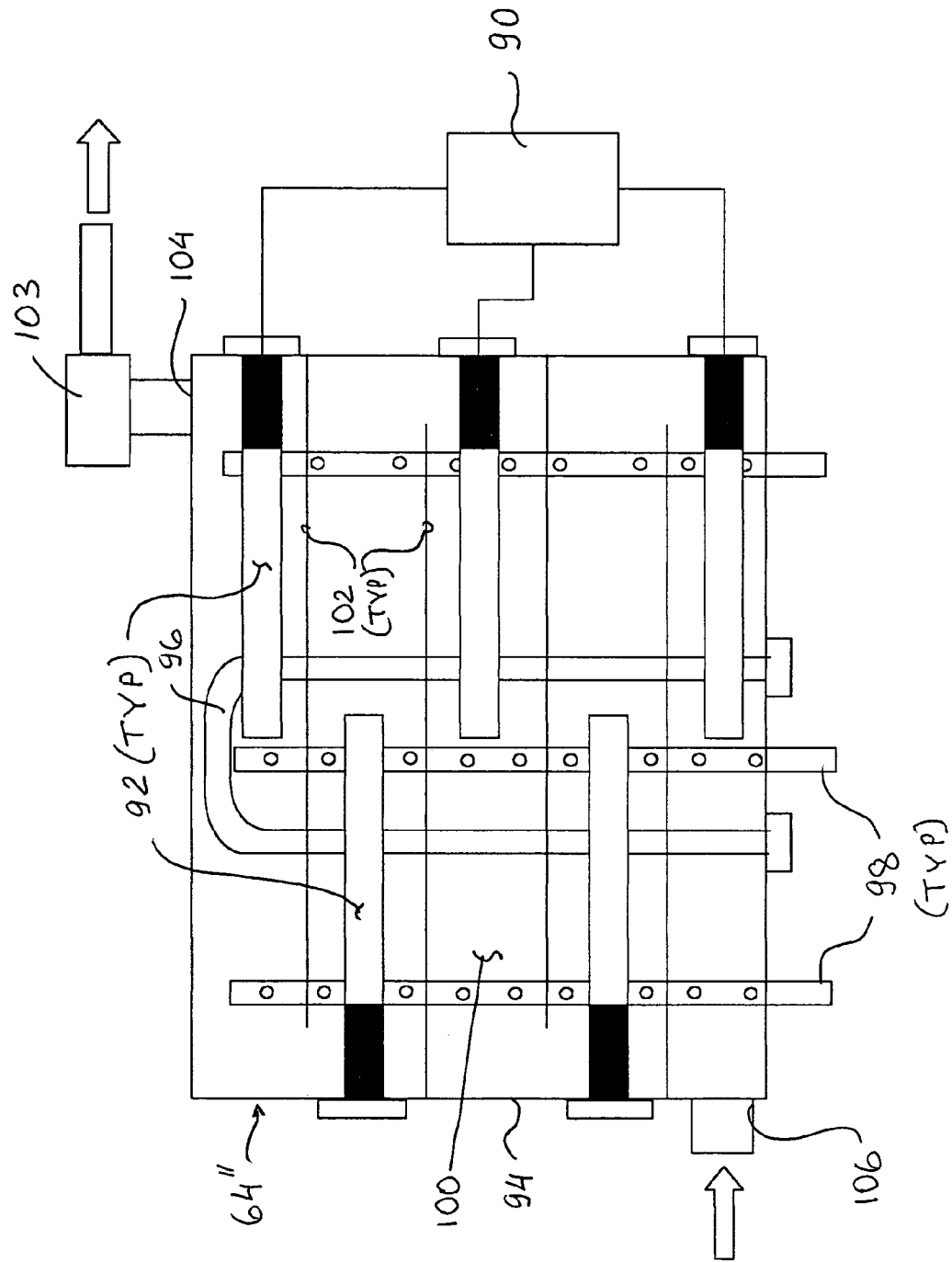
FIG. 3 is a schematic representation of a plan view (with top plate removed for clarity) of an on-site, on-demand urea to ammonia system constructed in accordance with the principles of the present invention, and which is of the type incorporating a parallel transducers array and a defined flow channel for the urea solution.
Figure 4:
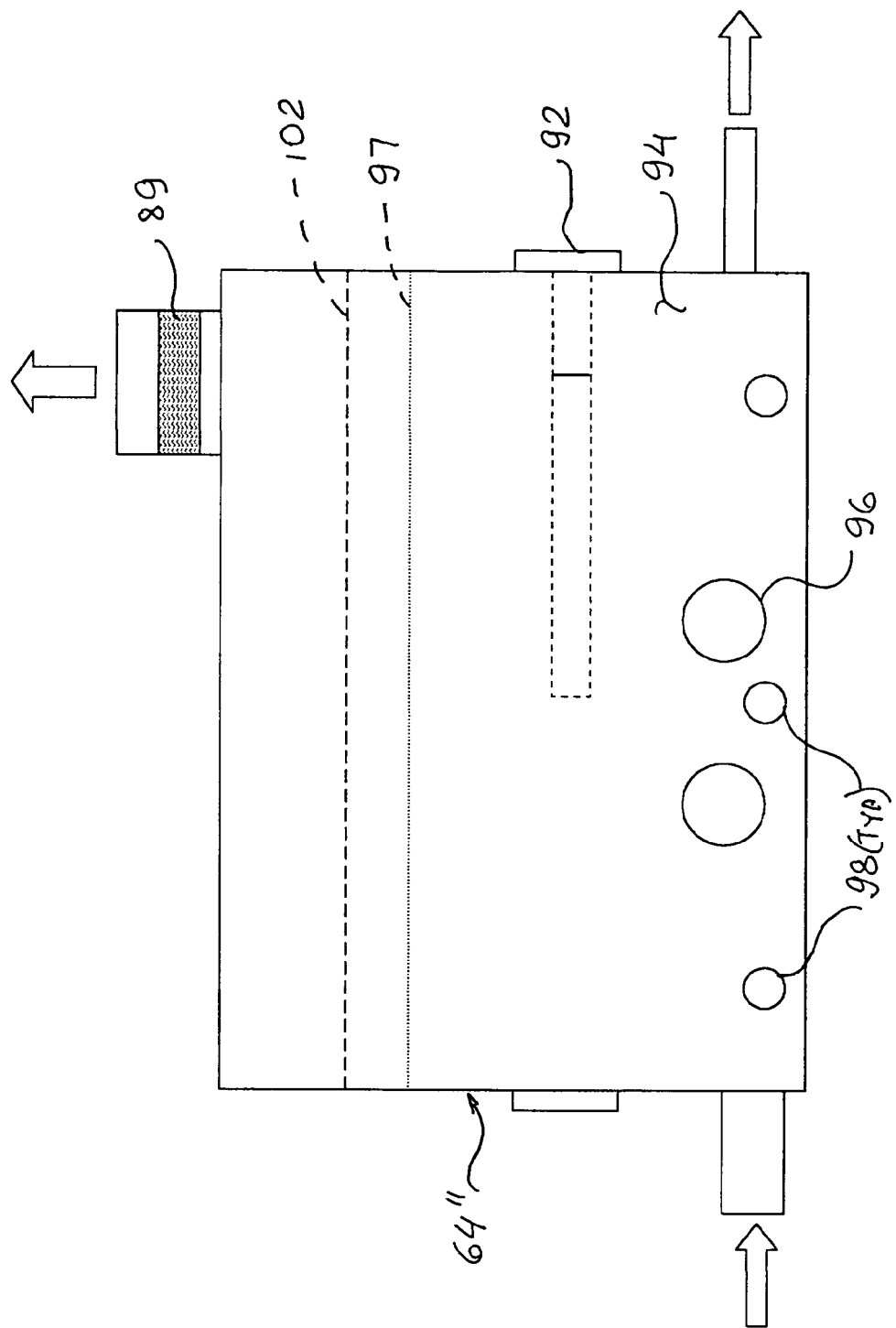
FIG. 4 is a side elevational view of the urea to ammonia system illustrated in FIG. 3
Figure 5:
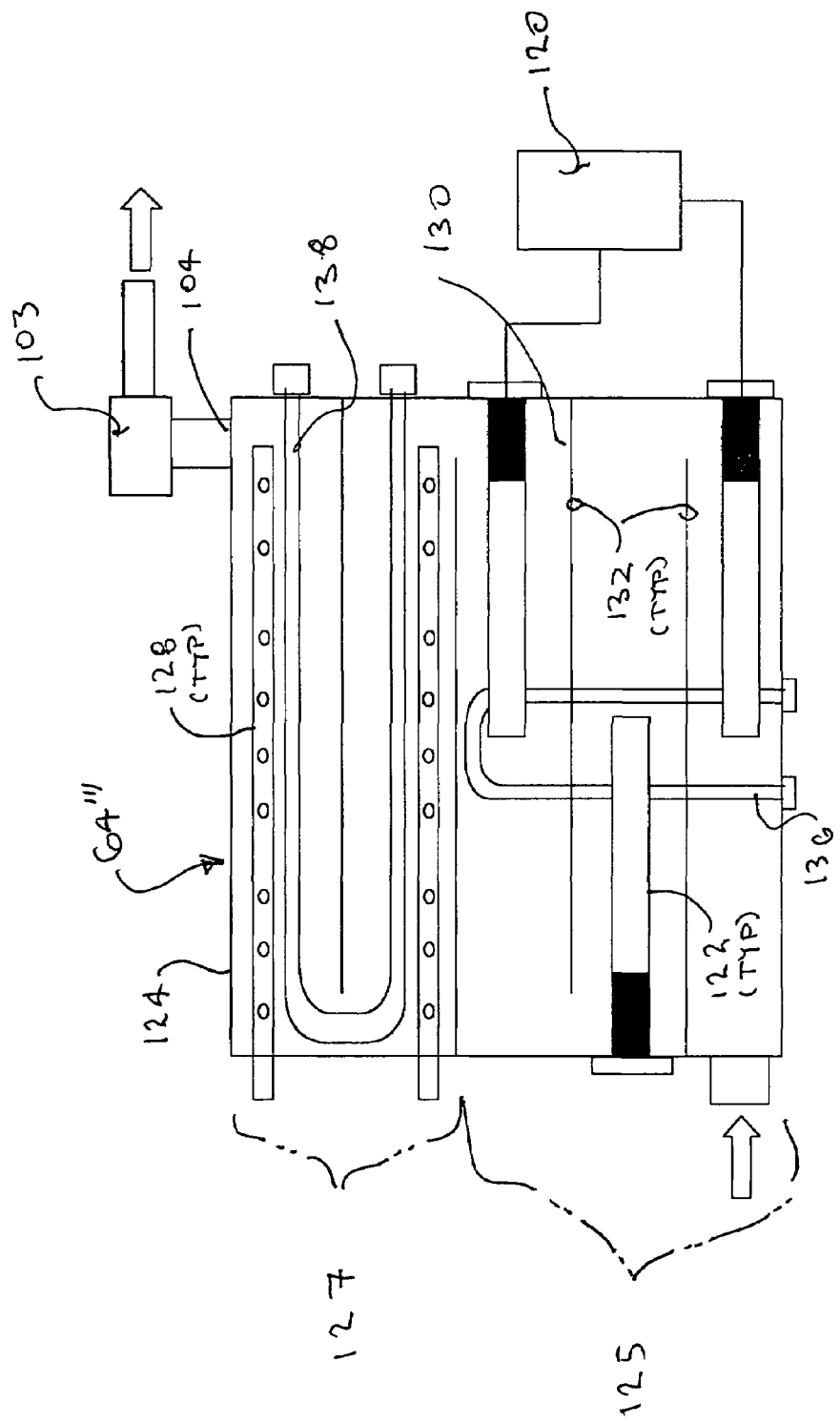
FIG. 5 is a schematic representation of an on demand urea to ammonia system such as shown in FIGS. 3 & 4, with the primary distinction therebetween being that the last two flow channel portions do not contain transducers therein.

FIG. 1 schematically illustrates a fossil fuel burning power plant 20 utilizing the apparatus and method of the present invention therewithin. Briefly, the power plant 20 has a combustor/burner (furnace) 22, which is supplied preheated air through inlet duct 24, and fuel through a suitable fuel inlet (not shown). The fuel is combusted with air, producing a flue gas flow 28. The flue gas flow 28 contains $NO_x$ and $SO_x$ gaseous pollutants, particulate pollutants (sometimes referred to as flyash), and also other combustion products. The flue gas flow heats water flowing in known boiler tubes (not shown), and converts the water to steam. The steam is supplied to a suitable turbine/generator (not shown), which produces electric power.

Flue gas flows through the primary flue gas duct 36 and, as shown, through a non-traditional, or "in duct" selective catalytic reduction (SCR) system 38 for the reduction of $NO_x$ from the flue gas stream. The flue gas flow 28 then passes through a heat recovery apparatus 40 (referred to hereinafter as air preheater 40), wherein heat is transferred to an incoming air flow 42, to provide preheated air flow through conduit 24. After leaving the air preheater 40, the gas flow 28 enters an electrostatic precipitator 44, in which a large fraction of the flyash is removed by application of electrostatic fields to the flue gas passing through the precipitator. Although not illustrated, another well known arrangement for removing particulate from flue gas stream, is a baghouse, wherein the particulate in the flue gas stream passing therethrough is collected on the surfaces of filter bags contained therein. The "cleansed" flue gas then flows through an exhaust stack 46 for discharge to the atmosphere.

The discussion of the power plant 20 is intended to be highly schematic in nature, and to provide the information and background necessary to understand, practice and enable the present invention. In an operating power plant, there are typically many other systems, as well as alternative systems, that are not shown here. The present invention is compatible with such other systems and may, wherever applicable, be used with them.

The invention described hereinafter was conceived to overcome the hereinabove mentioned problems and inefficiencies by designing a safe, economical and predictable process for providing a urea to ammonia system, generally indicated at 49, when only a small amount of ammonia is required to be produced [i.e. for SCR for small combined cycle systems or for in-duct catalyst applications (see schematic introduction of ammonia at 50), flue gas conditioning to enhance precipitator efficiency (see schematic introduction of ammonia at 52) and/or alleviate plume problems, for SNCR applications directly into the boiler 22 (see schematic introduction of ammonia at 54, and the like].

System 49 is schematically illustrated in FIG. 1 as comprising: a source for solutionized urea (preferably 15 to 50% urea to water, by weight), shown as storage tank 60; an ultrasonic hydrolysis assembly 64; a pump 62 for selective and variable delivery of solutionized urea to assembly 64 from tank 60, via conduit 65; and a dilution air subassembly 66 for diluting the gas stream exiting from the hydrolysis assembly 64, prior to the gas stream, containing gaseous ammonia, is conveyed to its intended use target (i.e. at injection points 50, 52 and/or 54). Subassembly 64 may be of any known type or configuration and, as shown, comprises: a fan 70 which blows process dilution air through heater 72 where it joins with and dilutes (via valved line 74) gaseous ammonia exiting from assembly 64. As shown the diluted gaseous ammonia stream passes through a gas mixer 76 disposed in conduit 78, which leads to one or more of the downstream processes which requires gaseous ammonia.

The ultrasonic hydrolysis assembly 64 may take more than one form and preferred embodiments thereof are illustrated in FIGS. 2, FIGS. 3-4, and FIG. 5 as assembly 64', 64" and 64''', respectively.

Exemplary hydrolysis assembly 64' comprises: an external ultrasonic generator 80 electrically connected to a plurality (as shown three) ultrasonic transducers 82 which adapted to be suspended within the ultrasonic hydrolysis casing 84 in a manner that the transducers 82 are below the normal level 87 of the liquid within the casing 84; a suitable heater 86 (electrical or steam), which is operative to maintain the temperature of the liquid within the casing 84 at least at or near the boiling point thereof; and a steam sparging assembly 88. A suitable mist eliminator 89 is shown adjacent the outlet of assembly 64' to better insure that only a gaseous flow containing ammonia is emitted from the assembly 64', and that contaminants, if any, from the urea solution are not carried over from the assembly 64'.

Assembly 64' is operational as follows:
1. Solutionized urea is directed to assembly 64' via conduit 65. The solution within the assembly 64' is maintained at a temperature and pressure of 80 to 150° C. and 1 to 5 bar, respectively, via any suitable means (i.e. heater 86, preheating of the solutioinized urea before or during transport to assembly 64', and/or heat from the steam sparging).
2. The ultrasonic generator 80 is energized to cause the transducers 82 to create a powerful sonic field by emitting ultrasonic waves, for example in the range of 15 to 100 kHz, preferably 20 to 40 kHz.
3. Creating the ultrasonic waves in the solutionized urea results in ultrasonic processing which, in turn, results in the hydrolysis of at least some of the adjacent solutionized urea into ammonia and carbon dioxide. It is important to note that this hydrolysis is accomplished while maintaining the static temperature and pressure of the solution within the hydrolyzer casing at around 80 to 150° C. and 1-5 bar.
4. The sparging assembly 88, which as shown is steam operative, serves a dual purpose of controlling and increasing the amount of gaseous ammonia removed from the solutionized urea for use by downstream processes, and also adding additional heat to the solutionized urea to assist in making up the loss of temperature of the urea solution, which resulted from the endothermic hydrolysis of the urea into ammonia and carbon dioxide.

Exemplary hydrolysis assembly 64" comprises an external ultrasonic generator 90 electrically connected to a plurality (as shown five) elongated ultrasonic transducers 92. The transducers 92, which are transversely spaced from one another, each have one axial end thereof supported by the hydrolysis casing 94, intermediate the upper and lower sides of casing 94, and cantilever axially inwardly therefrom. In this particular embodiment, two of the transducers 92 have their axial end supported on one side of the casing 94 and the other three have their respective axial ends supported on the opposite side of the casing 94. A circuitous upwardly open channel 100 is formed within casing 94 and is defined by spaced channel plates 102 which are disposed between adjacent pairs of transducers 92 and are arranged to provide a circuitous path for the solutionized urea from one side of the casing 94 to the other. The upper ends of the plates 102 are free and at an elevation higher than the operational level 97 of the solution within the casing 94.

Hydrolysis assembly 64" additionally includes: a plurality (as shown three) elongated sparging assemblies 98 which are transversely spaced and axially extending in a direction opposite the axis of elongation of the transducers 92; a suitable heater assembly 96 for maintaining the selected operational temperature of the solution within the hydrolysis assembly 64"; and a pump (schematically illustrated as 103) for recirculating the solutionized urea from casing outlet 104 back to the casing inlet 106 or, in the alternative, back to storage tank 60 for eventual recirculation back to the assembly 64", or for some other use.

As may be appreciated by one skilled in the art, insofar as the concept of using high frequency waves to assist in the hydrolysis of solutionized urea, is common to both the assembly 64' and 64", the assembly 64" works in much the same manner as the assembly 64' described hereinabove, with the primary distinction there between being:
 A. Assembly 64', as shown, is a "once through" system, whereas, assembly 64" is a "re-circulation system". As is well discussed in the prior art cited hereinabove, and with particular emphasis of the applicant's patents, in many instances a recirculation system has specific advantages over the once through systems.
 B. Assembly 64" is more controllable and potentially more efficient in the time it takes in producing a given quantity of ammonia.

Hydrolysis assembly 64''' is similar to hydrolysis assembly 64" discussed hereinabove and comprises: a hydrolysis casing 124 which is transversely divided into a ultrasonic section 125 and a sparging and/or evaporating section 127; and an external ultrasonic generator 120 electrically connected to a plurality (as shown three) elongated ultrasonic transducers 122. The transducers 122, which are transversely spaced from one another, each have one axial end thereof supported in the ultrasonic section 125, intermediate the inlet and outlet ends thereof, and cantilever axially inwardly therefrom. In this particular embodiment, two of the transducers 122 have their axial end supported on one side of section 125 and the other transducers 122 has its axial end supported on the opposite side of the section 125. A circuitous upwardly open channel 130 is formed within casing 124 and is defined by spaced upwardly extending channel plates 132, which are arranged to provide a circuitous path for the solutionized urea from one side of the casing 124 to the other. The plates 132 are transversely spaced within the casing 124. The upper ends of the plates 132 are unsupported and at an elevation higher than the operational level of the solution within the casing 124.

The ultrasonic section 125 additionally includes a suitable heater assembly 136 therewithin for maintaining a selected temperature of the solution within the section 125. The sparging (nee mechanical agitating) and/or evapoation section 127 includes a plurality (as shown two) elongated sparging assemblies 128 transversely spaced form one another and axially extending in second transverse direction opposite such first mentioned transverse direction, as well as a suitable heater assembly 138 for maintaining a selected operational temperature of the solution within the section 25, which may be varied independently of the heater 136. A pump (schematically illustrated as 103) for recirculating the solutionized urea from casing outlet 104 back to the casing inlet 106 or, in the alternative, back to storage tank 60 for eventual recirculation back to the assembly 64″ may also be included.

As may be appreciated by one skilled in the art, the operation of assembly 64‴ is very similar to the operation of assembly 64″ discussed hereinabove, with the primary exception therebetween being that the primary evaporation and/or sparging occurs in section 127 and the primary ultrasonic processing of the urea solution takes place in the ultrasonic section 125, making it easier to maximize the efficiency and effectiveness of the ultrasonic and sparging applications. Furthermore, because sections 125 and 127 have independent heaters the respective temperature of the sections can also be optimized for sparging and/or evaporation and ultrasonic applications. For even further effectiveness of the sections 125 and 127, they can be separated from one another in a manner that the section 127 can be independently pressurized from the ultrasonic section 125. With such an independent arrangement, a higher pressure can be applied at section 127, than may be desirable or necessary for the optimal operation of the ultrasonic section 125, for it is known that a relatively higher pressure (i.e. 10 bar or more), coupled with sparging, will yield a greater and/or more controlled completion of urea hydrolysis and the release of gaseous ammonia from the urea solution.

Inasmuch as the invention herein is primarily directed to the concept of producing relatively small quantities of ammonia from a solutionized feedstock, on demand and on site, by the use of sonochemistry aided hydrolysis and, further the nature and operation of ultrasonic generators and transducers is well known in the art, further description of sonochemistry and ultrasonic generators thereof is not believed to be required, and for detailed descriptions thereof, the reader is directed to standard sources for some of such materials to the hereinabove setforth references and for materials relating to ultrasonic systems and some typical applications, the reader is directed to: "Ultrasound makes Waves in the CPI":, Chemical Engineering, August 1999; "Star in a Jar", Popular Science, December 1998; "News and Notes" Mechanical Engineering, November, 2004; an advertising Brochure of EIMCO Water Technologies, published in 2004 and titled "EIMCO® Sonolyzer™-Sludge Disintegration and Minimization"; and U.S. Pat. Nos. 5,538,628; 5,372,634 and 6,500,219. Furthermore, it is to be understood and appreciated that the descriptions hereinabove are merely of preferred embodiments of the invention and further modifications can be made thereto without departing from the scope of the invention herein, for example: more or less transducers may be provided; although not shown, the generated ammonia may, in instances of small boiler usage, be used for the normal SCR supply, rather than simply in-duct SCR usage; other forms of physical agitation may be used for sparging; any suitable transducer design may be utilized so long as it is operative to achieve the intended results in hydrolyzation of urea to ammonia in the quantity desired; if the transducer technology is available and the capital and running costs are within permissive competitive parameters, scaled up systems such as described hereinabove may be used for more conventional SCR boiler applications; the number and cycling of energized transducers may be varied, as well as the pulsing and frequencies; evaporation can take place with or without mechanical agitation (sparging) and/or recirculation; and the like.

The invention herein shall be defined by the scope and content of the claims herewith, which include:

The invention claimed is:

1. A method for treating the exhaust stream from a fossil fuel burning facility, wherein a gaseous mixture containing ammonia is injected into the exhaust stream to assist in the removal of air pollutants therefrom, comprising the steps of:
   providing a liquid of urea/water solution to a hydrolyzer chamber;
   creating an ultrasonic field within the liquid in the hydrolyzer chamber to "cold boil" portions of such solutionized urea to accelerate hydrolysis of the solutionized urea and produce at least ammonia in such liquid; and
   agitating and/or evaporating portions of such solution containing ammonia, to release gaseous flow containing ammonia therefrom; and
   directing such gaseous flow, for injection into such exhaust stream.

2. A method as specified in claim 1 including the additional steps of:
   maintaining the temperature of the solutionized urea within the hydrolyzer chamber in the range of 80 to 150° C.; and
   maintaining the pressure of the solutionized urea within the hydrolyzer chamber in the range of 1 to 5 bar.

3. A method as specified in claim 2 including the additional step of continuously detecting the gaseous ammonia requirements for such assistance in the removal of such air pollutants and, in response thereto, selectively: varying the ultrasonic field intensity; varying the flow rate of such solution; varying such agitation; and/or varying the rate of vaporization of such hydrolyzed urea to, in turn, vary the quantity of gaseous ammonia available for such last mentioned directing.

4. A method as specified in claim 3 wherein the ultrasonic field is established by sound waves in the frequency range of 15 to 100 kHz.

5. A method as specified in claim 1 wherein said agitating is by steam sparging.

6. A method as specified in claim 2 wherein the pressure of the solutionized urea within the hydrolyzer chamber is maintained in the range of 1.2 to 3 bar.

7. A method as specified in claim 4 wherein the ultrasonic field is established by sound waves in the frequency range of 20 to 40 kHz.

\* \* \* \* \*